Figure 1:
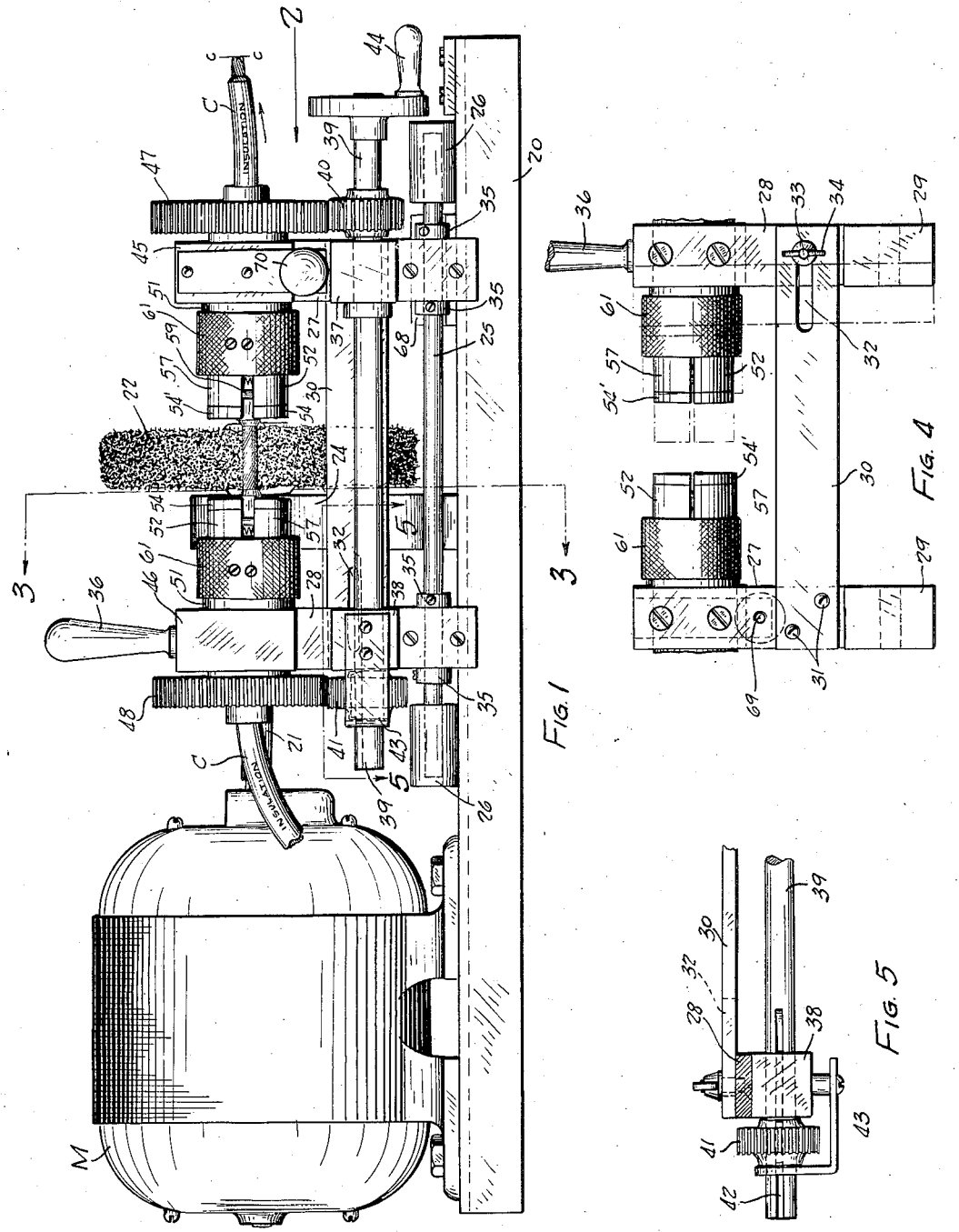

Nov. 19, 1935.　　　C. E. MASON　　　2,021,421

INSULATION STRIPPING MACHINE

Filed Dec. 10, 1934　　　3 Sheets-Sheet 1

WITNESSES:

INVENTOR:
CHARLES E. MASON.
BY
ATTORNEY

Nov. 19, 1935.  C. E. MASON  2,021,421
INSULATION STRIPPING MACHINE
Filed Dec. 10, 1934    3 Sheets-Sheet 2

INVENTOR:
CHARLES E. MASON

Nov. 19, 1935.  C. E. MASON  2,021,421
INSULATION STRIPPING MACHINE
Filed Dec. 10, 1934   3 Sheets-Sheet 3
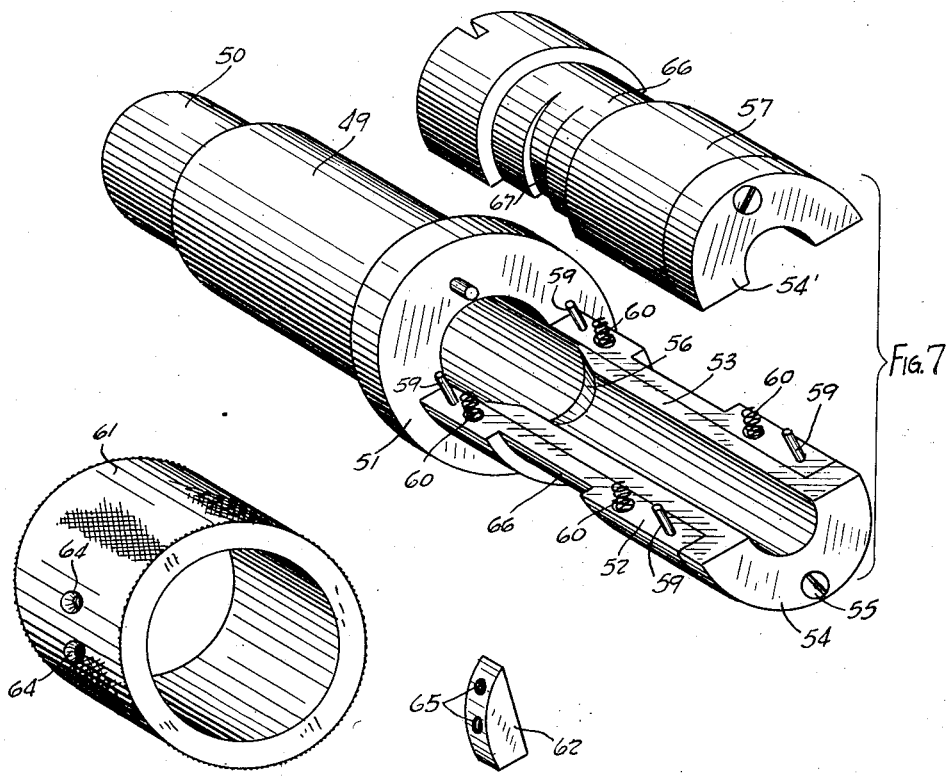
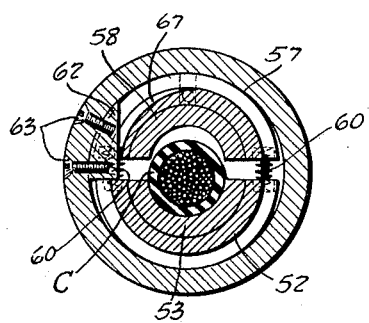
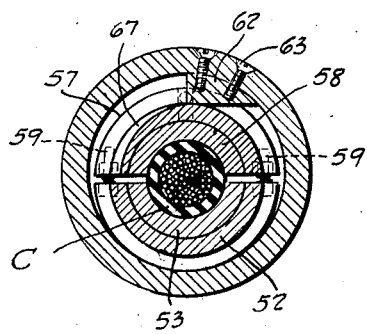
WITNESSES:
INVENTOR:
CHARLES E. MASON
BY
ATTORNEY Patented Nov. 19, 1935

2,021,421

UNITED STATES PATENT OFFICE 2,021,421

INSULATION STRIPPING MACHINE

Charles E. Mason, Upper Darby Township, Delaware County, Pa., assignor to Novelty Electric Company, Philadelphia, Pa., a corporation of Pennsylvania Application December 10, 1934, Serial No. 756,792

17 Claims. (Cl. 15—88)

This invention relates to insulation stripping machine, and has for an object to provide means for removing the insulation from insulated electric cables.

A further object of the invention is to provide means for completely removing the insulation from the conductor and burnishing the conductor without injury to the conductor.

A further object of the invention is to provide means for removing a section of insulation from an insulated conductor, the while the conductor is held against distortion.

A further object of the invention is to provide a movable abrading member and means to move an insulated cable into the area of movement of said abrading member, and rotate said cable to bring all parts of the cable into such engagement, with means limiting the movement to the complete removal of the insulation and the burnishing of the conductor for tinning or further processing.

A further object of the invention is to provide a motor-driven abrading disc, together with a frame adapted to hold an electric cable in substantially rigid condition and against distortion, with means for moving the frame toward the abrading disc accompanied by a rotary movement of the cable to the abrading disc, with means for limiting the movement of the frame to the position of engagement of the naked conductor to the abrading disc.

A further object of the invention is to provide an improved type of chuck for holding the cable.

A further object of the invention is to provide a pair of improved chucks each adapted to clamp an electric cable, with means for rotating the chucks in synchronism.

A further object of the invention is to provide a chuck with improved means for opening and closing, and provided with a replaceable bushing for clamping cables of different sizes.

The invention, therefore, comprises a mechanical device including a power shaft which may be connected directly to a motor, or to other source of power, and upon which shaft is mounted an abrading disc, preferably in the form of a wire brush, but not limited thereto, with a frame mounted adjacent to the disc said frame carrying a shaft with manual means for rotating the shaft and gears mounted thereon, with other gears intergeared with said manually operated gears, said last mentioned gears carrying each a chuck through which an electric cable may be moved, and which chucks are closable to clamp the cable, with a section of the cable exposed between the chucks, and means to oscillate the frame to bring the exposed section of cable into engagement with the perimeter of the abrading disc, the while manually rotating the cable through the manually rotatable shaft, exposing the entire circumference of the insulation to the action of the abrading disc, an adjustable stop being provided for limiting the oscillation of the frame to such position that the insulation is completely removed, and the conductor exposed to the action of the abrading disc for burnishing, said conductor then being severed intermediate its length to provide terminals for said conductor when such provision is required.

Figure 2:
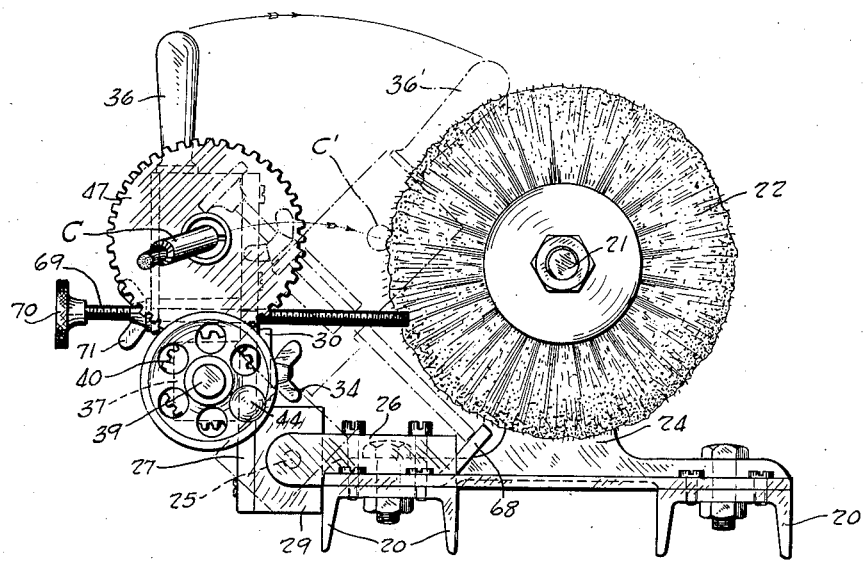
Figure 3:
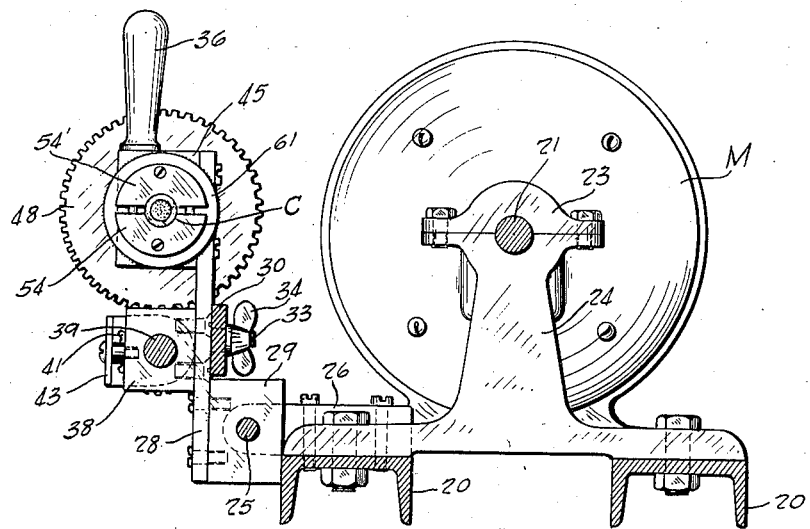
Figure 6:
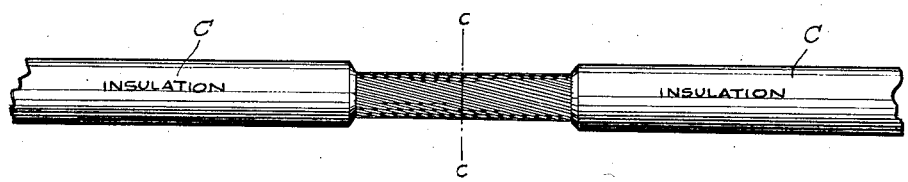

The drawings illustrate an embodiment of the invention and the views therein are as follows:

Figure 1 is a view of the machine in front elevation,

Figure 2 is a view of the machine in end elevation, as indicated by arrow 2 at Figure 1, Figure 3 is a vertical sectional view taken on line 3—3 of Figure 1, Figure 4 is a view of the inner or back side of the oscillating frame showing means for adjustment, Figure 5 is a sectional view taken on line 5—5 of Figure 1, Figure 6 is a view in elevation of an insulated cable with the insulation removed by the machine, Figure 7 is a perspective view of one of the chucks, one jaw being removed, Figure 8 is a perspective view of the knurled sleeve for closing the chuck, Figures 9 and 10 are transverse sectional views through the chuck on the same plan, Figure 9 showing the chuck open and Figure 10 showing the chuck closed, and Figure 11 is a perspective view of the wedge member carried by the sleeve, shown at Figure 8, and operating upon one of the jaws of the chuck.

Like characters of reference indicate corresponding parts throughout the several views.

The improved insulation stripper is mounted upon any approved base, as indicated at 20, such base, however, being subject to variation as circumstances may require.

Mounted upon this base is a power shaft 21 which may be driven from any available source of power, here shown as the motor M. The shaft 21 is provided with an abrading disc 22. At the present time a wire brush seems indicated as the approved type of abrading disc, but the invention will include any type now known and available, or which may hereafter become available. Electric circuits and switches for the operation of the motor when so used are not shown.

The shaft 21 is journaled in any approved bearings, as indicated at 23, supported upon the upright 24, but this may also be varied according to the construction preferred.

The base 20 is provided with a rod 25 supported in any approved manner, as by the blocks 26. This rod 25 may be stationary, and has mounted thereon a pair of arms 27 and 28 by means of blocks 29. One of the arms, as the arm 27, is provided with a bar 30 rigidly connected thereto in any approved manner, as by the bolts 31. This bar is provided with a slot 32 through which extends a bolt 33 having means for clamping the bar 30 against the arm 28, such means being conventionally shown as a winged nut 34. This connection permits the adjustment of the arms 27 and 28 to vary the interval therebetween.

The arms themselves so connected are also capable of adjustment as a unit. This is brought about by the collars 35 upon the rod 25. By loosening the set screws or other clamping means, these collars may be moved and therewith the unit comprising the arms 27 and 28. One of these arms, as the arm 27, is provided with a handle 36 by the use of which the unit thus connected may be swung through the arc indicated at Figure 2, to the position 36, for the purpose hereinafter more fully described.

Mounted also upon the arms 27 and 28 are bearing blocks 37 and 38, in which is journaled a shaft 39. This shaft 39 is provided with a pinion 40 rigidly connected thereto, and a pinion 41 splined thereon, a groove 42 in the shaft 39 accommodating the movement of said pinion 41 when moved with the block 38 and its arm 28.

A bracket 43 is provided for holding the pinion 41 in proper relation to the arm 28 during such movement. The shaft 39 is provided with a crank 44 by which the shaft 39 and the pinions 40 and 41 may be manually rotated.

Mounted also upon the arms 27 and 28 are bearing blocks 45 and 46. In the bearings provided by these blocks 45 and 46, chucks are journaled having gears 47 and 48, respectively, rigidly connected therewith, and intergeared with the pinions 40 and 41.

The two chucks are identical and the description of one of these chucks will be the description of both.

The chucks as shown at Figures 7 to 11 inclusive, comprise a sleeve 49 which is the member directly journaled in the blocks 45 and 46, and reduced end part 50 being provided for connection with the gears 47 and 48.

The chuck is provided with a collar 51 which bears against the inner sides of the blocks 45 and 46 in opposition to the gears 47 and 48 which bear against the opposite sides, and thus maintain the chucks against longitudinal movement.

The chuck comprises a semi-tubular part 52 having a bore of such diameter as to accommodate a cable of the largest dimension contemplated. For smaller cables a bushing 53 is provided, having a semi-annular head 54 and secured within the tubular part of the sleeve 52 in any approved manner, as by the screw 55. Preferably, the end of the bore opposite the head 54 will be flared, as indicated at 56.

This semi-tubular part 52 with its bushing constitutes one of the jaws of the chuck, the other jaw being a similar semi-sleeve 57 provided with a similar boss, only the head 54 being shown at Figure 7, but shown in section at 58 in Figures 9 and 10.

The two jaws of the chuck are interconnected by means of pins 59 with springs 60 tending to separate the jaws. For retaining the jaws in union and for actuating the same, knurled sleeves 61 are provided. The sleeve 61 is of such internal diameter as to pass over the larger part of the tubular sleeve 52, and is provided internally with a wedge 62 which is secured in any approved manner, as by the screws 63 through the perforations 64 of the sleeve and the threaded holes 65 of the wedge.

For accommodating the wedge 62 the jaws of the chuck are provided with similar reduced sections 66 and the movable jaw 57 is provided with a cam-way 67 in which the wedge 62 rides and which serves to retain the knurled sleeve 61 against removal. A manual rotary movement of the sleeve 61, therefore, tends to move the wedge 62 along the cam-way 67 to close the movable jaw of the chuck, such movement being relatively shown at Figures 9 and 10.

The chucks are open throughout their entire lengths for the passage therethrough of the cable C and after being clamped in the manner just above described, the unit including the chucks is moved to the dotted line position, as shown at Figure 2, to bring the insulation of the cable C into engagement with the rotating periphery of the abrading disc 22. It is desirable that this movement shall be such as to remove the entire insulation from the cable and to make such engagement of the cable with the disc as will burnish the cable without undue pressure. For this purpose a stop 68 is rigidly attached to the frame 20 and one of the arms, as for instance, the arm 27 is provided with a threaded bolt 69 therethrough having a knurled head 70 for manual actuation.

To lock the bolt 69 in an attained adjustment, a winged nut 71 is provided. By the proper adjustment of the bolt 69 the end of that bolt will engage the stop 68 when the unit has moved to such limit as will properly subject the conductor to the burnishing action of the disc 22, but no farther.

The invention, while adapted for rather general use, is obviously of greater utility in such establishments as will handle a large amount of cable from which the insulation is to be stripped, and preferably in considerable quantities of the same size of cable.

The chuck having been provided with bushings of the proper diameter to properly clamp the cable of the size to be employed, the chuck is opened by the rotation of the sleeve 61. The cable is now drawn through the chuck in either direction, but for convenience, preferably in the direction indicated by the arrow accompanying said cable at Figure 1.

When the proper position for the stripping of the insulation has been presented between the chucks, the chucks are closed by the manual rotation of the sleeve 61. As these two chucks are identical, it is obvious that the chucks themselves being reversed in position, the rotation of the sleeve 61 will be in opposite directions.

As the chucks are held against relative rotation by their intergearing through the gears 47 and 48, the pinions 40 and 41 and the shaft 39, the opposite rotation of these sleeves will impart no movement to the chucks as an entirety, but will, by their opposite rotation, hold such chucks stationary and prevent any twisting of the cable.

Such cables are usually made up of twisted strands of wire and the twisting in one direction will enlarge this conductor and in the opposite direction will ensmall the conductor. It is desirable that the conductor be at all times maintained at its original diameter. The cable being clamped by the opposite rotations of the sleeves 61, the unit carrying said cable is now moved in the direction indicated by the arcuate arrow at Figure 2 toward the disc 22. When contact has been made with the disc 22, the cable is manually rotated by the operator by power applied to the crank arm 44, which will bring all parts of the insulation into engagement with the perimeter of the disc. Manual stress being simultaneously applied to the handle 36, it is obvious that the abrading disc will thereby effectively remove the insulation from the cable, and a slight further movement beyond such removing limit will expose the conductor itself to the action of the abrading disc whereby the conductor is burnished so that it is in proper condition for tinning, or for use in any other way in which it is found desirable to make electrical connections.

The section of insulation having been removed, as shown at Figure 6, and the conductor burnished, the chucks are opened by the reverse rotary movements of the sleeves 61 and the chucks opened by the springs 60. The cable is now free to be drawn through the chucks to another position for stripping. After being stripped, as indicated at Figure 6, the cable may be cut along the line c—c, providing thereby two burnished extremities for the application of terminals thereto, or for other purposes.

As above described the stripping will correspond in length to the width or thickness of the abrading disc. Under both conditions, this will be the plan followed, and when it is desired to strip the insulation to a lesser or greater extent, abrading discs of different thicknesses will be employed.

It happens, however, on occasion that a greater amount of stripping is desired than is provided by the thickness of the abrading disc. In such condition, the sleeves 35 are loosened, which will permit the longitudinal movement of the unit as an entirety. So arranged, the unit will not only rotate the cable relative to the abrading disc, but it may also be moved longitudinally so that the stripped section will be greater than the thickness of the abrading disc.

It is desirable that only approximately so much of the cable as is to be stripped shall be positioned between the chucks. When abrading discs of different thicknesses are employed, the interval between the chucks is varied by loosening the winged nut 34, and moving the arms 27 and 28 nearer together or farther apart, as indicated in dotted lines at Figure 4, as their then position may make necessary or desirable. The tightening of the nut 34 will again produce a rigid unit which will be employed as above described.

As it is desirable that at no time shall the cable be subjected to any excessive amount of twisting, it will be obvious that in the stripping of the insulation the cable may be rotated first in one direction to a single rotation, and then reversed to its original position, during which two movements the insulation will be properly removed and without undue twisting of the cable as a whole.

Of course, the insulation stripping machine illustrated may be modified and changed in various ways without departing from the invention herein set forth and hereinafter claimed.

I claim:—

1. An insulation stripping machine comprising a movable abrading member, and means to positively hold an insulated cable in position to be affected by the abrading member, said means also constituting a means to move the insulated cable laterally into the sphere of action of the abrading member.

2. An insulation stripping machine comprising a rotating abrading member, and means to rigidly hold and move an insulated cable laterally into the sphere of action of the abrading member.

3. An insulation stripping machine comprising a movable abrading member, means to hold an insulated cable in rigid position and move the insulated cable laterally into the sphere of action of the abrading member, and means to rotate the cable within such sphere.

4. An insulation stripping machine comprising a rotating abrading member, means to positively hold an insulated cable in rigid position and move the insulated cable laterally into the sphere of action of said abrading member, and means to rotate the cable within such sphere.

5. An insulation stripping machine comprising a movable abrading member, means to rigidly position and move an insulated cable laterally into the sphere of action of said abrading member, and means to limit the movement to the thickness of the insulation.

6. An insulation stripping machine comprising a rotating abrading member, means to rigidly position and move an insulated cable laterally into the sphere of action of said abrading member, means to rotate the cable within such sphere, and means to limit the movement to the thickness of the insulation.

7. An insulation stripping machine comprising a pair of spaced chucks adapted to grip a cable at spaced points, means to move the chucks simultaneously to bring the insulated cable into the sphere of action of the abrading member, and means to rotate said chucks simultaneously with the cable in such sphere.

8. An insulation stripping machine comprising a rotating abrading member, a pair of chucks adapted to grip an insulated cable at spaced points, means to move the chucks to bring the cable into the sphere of action of the abrading member, means to rotate the chucks simultaneously to rotate the cable within such sphere, and means to limit the movement of the chucks to the depth of the insulation.

9. An insulation stripping machine comprising a movable abrading member, a pair of chucks adapted to grip an insulated cable and to maintain a section of cable therebetween substantially rigid, means to move the chucks to bring the insulated cable into the sphere of action of the abrading member, means to synchronously rotate the chucks to feed the insulation to the abrading member entirely about said cable, and means to limit the feeding action to the thickness of the insulation.

10. An insulation stripping machine comprising a movable abrading member, a pair of chucks adapted to grip a cable at spaced points, means to adjust the interval between the chucks, means to move the chucks to bring the cable into the sphere of action of the abrading member, means to rotate the chucks synchronously to rotate the cable within such sphere, and means to limit the feeding movement of the chucks to the thickness of the insulation.

11. An insulation stripping machine comprising a movable abrading member, a frame mounted to oscillate, means mounted upon the frame for rigidly positioning and presenting a section of cable laterally to the abrading member, and means to move the frame longitudinally thereof and relative to the abrading member.

12. An insulation stripping machine comprising a rotating abrading member, a frame mounted to oscillate relative to the abrading member, a pair of chucks carried by the frame adapted to sustain a section of cable in position for presentation to the abrading member, means to move the frame longitudinally of the cable relative to the abrading member, and means to limit the longitudinal movement.

13. An insulation stripping machine comprising a movable abrading member, a pair of aligned chucks constituting means to support a section of cable therebetween, and manual means for rotating said chucks in synchronism.

14. An insulation stripping machine comprising a movable abrading member, a frame pivoted to oscillate relative to the abrading member, a pair of chucks spaced apart and carried by the frame adapted to sustain a section of cable therebetween, means to move the frame longitudinally to vary its relation relative to the abrading member, means to oscillate the frame to move the cable into the sphere of action of the abrading member, and manual means to rotate the chucks synchronously in either direction.

15. An insulation stripping machine comprising a movable abrading member, a frame mounted to oscillate relative to the abrading member, said frame comprising spaced arms, means to vary the interval between said arms, a chuck carried by each of said arms and having axial passages in alignment each with the other, means to oscillate the frame toward the abrading member, means to rotate the chucks synchronously in either direction, and means facilitating the movement of the frame in a direction in alignment with the passages of the chucks.

16. An insulation stripping machine comprising a rotating abrading member, a frame pivoted to oscillate toward and away from the abrading member, said frame comprising a pair of spaced arms, means to move the arms to vary the interval therebetween, a pair of tubular chucks carried by the arms in axial alignment, means to actuate said chucks by the rotation of chuck parts in opposite directions, means to limit the oscillating movement of the frame, means to facilitate the movement of the frame in alignment with the axes of the chucks, and means to rotate the chucks in synchronism in either direction.

17. An insulation stripping machine comprising a base, a rotating abrading member journaled upon the base, a frame mounted upon the base to oscillate toward and away from the abrading member, said frame comprising a pair of spaced arms, means to adjust the arms to vary the interval therebetween, means facilitating the movement of the frame longitudinally of its pivot, a pair of chucks carried by the arms and thereby spaced apart, said chucks each providing an axial passage therethrough, a sleeve embracing each of said chucks and adapted when rotated in opposite directions to close the chucks to clamping positions, means to move the frame toward the abrading member with the interval between the chucks corresponding to the thickness of the abrading member, means to rotate the chucks synchronously when in the sphere of action of the abrading member, and means to limit the oscillating movement of the frame toward the abrading member.

CHARLES E. MASON.